US007200490B2

(12) United States Patent
Lange et al.

(10) Patent No.: US 7,200,490 B2
(45) Date of Patent: Apr. 3, 2007

(54) GPS RECEIVER WITH AUTOPILOT AND INTEGRATED LIGHTBAR DISPLAY

(75) Inventors: Arthur Lange, Sunnyvale, CA (US); Gregory Robin Price, Christchurch (NZ); Gregory Craig Wallace, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/987,096

(22) Filed: Nov. 12, 2004

(65) Prior Publication Data

US 2005/0171693 A1  Aug. 4, 2005

Related U.S. Application Data

(63) Continuation-in-part of application No. 10/735,576, filed on Dec. 12, 2003.

(51) Int. Cl.
*B62D 27/00* (2006.01)
*G01C 21/00* (2006.01)
(52) U.S. Cl. .................. 701/209; 701/200; 180/168
(58) Field of Classification Search ............. 701/209, 701/23, 26, 207, 41, 50, 213, 122, 215, 214, 701/226, 200, 224, 3, 28, 202, 93, 208; 342/357.17, 342/357.03, 457, 46, 47; 180/168, 204; 340/974, 340/988, 815.45, 461, 525, 684
See application file for complete search history.

(56) References Cited

U.S. PATENT DOCUMENTS

| 3,946,825 | A | * | 3/1976 | Gail ........................ 180/401 |
| 5,945,917 | A | * | 8/1999 | Harry .................. 340/815.45 |
| 5,955,973 | A | * | 9/1999 | Anderson ................ 340/988 |
| 6,301,534 | B1 | * | 10/2001 | McDermott et al. ......... 701/41 |
| 6,445,983 | B1 | * | 9/2002 | Dickson et al. ............. 701/23 |
| 6,539,303 | B2 | * | 3/2003 | McClure et al. ........... 701/213 |
| 6,876,920 | B1 | * | 4/2005 | Mailer ...................... 701/207 |

\* cited by examiner

*Primary Examiner*—Dalena Tran

(57) ABSTRACT

A system for controlling a mobile machine is disclosed. In one embodiment, the system comprises an integrated guidance system coupled with a steering component. The integrated guidance system comprises a position determining system for determining the geographic position of the mobile machine. A guidance system coupled with the position determining system is for determining a deviation of the mobile machine from a desired direction. The integrated guidance system also comprises a display coupled with the guidance system for visually indicating a deviation from a desired direction and a steering interface for controlling the steering component. The steering component automatically controls the steering mechanism of the mobile machine in response to a steering command generated by the steering interface. In embodiments of the present invention, the position determining system, the guidance system, the display, and the steering interface are disposed within a housing.

52 Claims, 25 Drawing Sheets

100

GPS RECEIVER WITH AUTOPILOT AND INTEGRATED LIGHTBAR DISPLAY

RELATED APPLICATIONS

The present invention benefits from U.S. patent application Ser. No. 10/735,576 filed Dec. 12, 2003 titled Integrated Guidance System by Gregory Price and Gregory Wallace, assigned to the assignee of the present invention, and which is hereby incorporated by reference in its entirety herein.

This application is a continuation-in-part of and claims the benefit of copending application Ser. No. 10/735,576 filed on Dec. 12, 2003 and which designated the U.S.

BACKGROUND OF THE INVENTION

1. Technical Field

Embodiments of the present invention generally relate to guidance systems for controlling a mobile machine.

2. BACKGROUND ART

Guidance systems were developed to guide an operator of a mechanical system that is capable of movement, such as, for example, a vehicle, in traveling along a desired path, whereas the guidance system alerts the operator when he deviates from the desired path (which is predefined) and provides the corrective action that the operator needs to perform to continue on the desired path. These guidance systems provide a variety of functions. Typically, the variety of functions is dependent on the number of different types of guidance components possessed by the guidance system. Some guidance systems are designed to be handheld by the operator while driving the vehicle. More importantly, each of these guidance systems generally is a collection of separate guidance components that are coupled together with cables. Moreover, while one guidance system may have two separate guidance components, another guidance system may have less or more of these separate guidance components.

In particular, guidance systems are widely being utilized in agriculture. Guidance systems provide agricultural equipment operators with precise, parallel swath guidance for driving straight rows or following curves during tasks such as, for example, field preparation, seeding, harvesting, product applications to the fields, and field mapping. Hence, improved productivity, improved yield, and improved safety are realized through use of guidance systems. However, operating some types of equipment often necessitates highly repetitive operations. For example, when plowing or planting a field, an operator must make repeated passes across a field. Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human.

Unfortunately, guidance systems that are a collection of separate guidance components that are coupled together with cables and handheld guidance systems create several problems. The guidance systems that are a collection of separate guidance components that are coupled together with cables are prone to a variety of cable related problems (e.g., damage by accidental pulling of a cable, misplacement of a cable, incompatibility of cables, etc.) and can interfere with the operator's control of the agricultural equipment, such as, for example, a tractor, since the cab of the tractor is generally small. Moreover, handheld guidance systems distract the operator while driving the tractor since the operator has to look periodically at the handheld guidance system instead of looking in front of the tractor as it moves. Furthermore, these guidance systems provide a data input device that has a large number of buttons or keys that make it difficult for the operator to interact with these guidance systems as he drives the tractor.

SUMMARY OF THE INVENTION

A system for controlling a mobile machine is disclosed. In one embodiment, the system comprises an integrated guidance system coupled with a steering component. The integrated guidance system comprises a position determining system for determining the geographic position of the mobile machine. A guidance system coupled with the position determining system is for determining a deviation of the mobile machine from a desired direction. The integrated guidance system also comprises a display coupled with the guidance system for visually indicating a deviation from a desired direction and a steering interface for controlling the steering component. The steering component automatically controls the steering mechanism of the mobile machine in response to a steering command generated by the steering interface. In embodiments of the present invention, the position determining system, the guidance system, the display, and the steering interface are disposed within a housing.

BRIEF DESCRIPTION OF THE DRAWINGS

The accompanying drawings, which are incorporated in and form a part of this specification, illustrate embodiments of the invention and, together with the description, serve to explain the principles of the present invention. Unless specifically noted, the drawings referred to in this description should be understood as not being drawn to scale.

DETAILED DESCRIPTION OF THE PREFERRED EMBODIMENT

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1A:
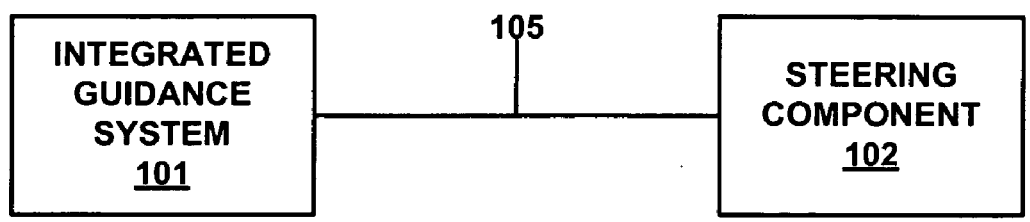
FIG. 1A is a block diagram of an exemplary vehicle control system in accordance with embodiments of the present invention.

FIG. 1A is a block diagram of an exemplary vehicle control system 100 in accordance with embodiments of the present invention. In FIG. 1A, an integrated guidance system 101 is communicatively coupled with a steering component 102 via coupling 105.

In embodiments of the present invention, integrated guidance system 101 determines the geographic position of a vehicle or other mobile machine and determines whether the vehicle is travelling in a desired direction. Additionally, fi the vehicle is not travelling in a desired direction, integrated guidance system 101 determines a course correction for the vehicle and generates a steering command to steering component 102 to implement the course correction. For the purposes of the present invention, the term "geographic position" means the determining in at least two dimensions (e.g., latitude and longitude), the location of mobile machine 105. Furthermore, for purposes of the present invention, the term "course correction" means a change in the direction traveled by the vehicle such that it is guided from a current direction of travel to a desired direction of travel.

In embodiments of the present invention, coupling 105 is a serial communications bus. In one embodiment, coupling 105 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture.

In embodiments of the present invention, steering component 102 is coupled with the steering mechanism of the vehicle being controlled. In embodiments of the present invention, steering component 102 may be a hydraulic steering actuator or an electric steering actuator. Additionally, while the present embodiment shows integrated guidance system 101 and steering component 102 as separate components, embodiments of the present invention are well suited to implement these components as a single device.

Embodiments of the present invention are advantageous because integrated guidance system 101 reduces the need for cables and other connections used in conventional guidance systems which are used to couple a collection of separate components. As will be described in greater detail below, the integrated guidance system of the present invention comprises a plurality of guidance components and a housing for the plurality of guidance components in which the guidance components operate in an integrated manner via a user interface to enhance user interaction with the integrated guidance system. Thus, the need for cables is significantly reduced or eliminated. Moreover, unlike conventional guidance systems, the operator of a mechanical system that is capable of movement, such as, for example, a vehicle, can easily use the integrated guidance system of the present invention while operating the mechanical system.

Additionally, embodiments of the present invention facilitate controlling the steering of mobile machines, thus allowing more precise control of the machine than may be realized by a human operator under certain conditions. For example, a snowplow may operate under conditions in which a human operator's ability to see the road is diminished. Additionally, when performing highly repetitive tasks such as plowing a field, embodiments of the present invention facilitate controlling the vehicle more precisely, thus minimizing errors in controlling the vehicle which may result in gaps or overlaps in the field.

It should be understood that the integrated guidance system of the present invention can be utilized with a variety of mechanical systems that are capable of movement. Although the present discussion will focus on guidance of vehicles such as, for example, agricultural vehicles and equipment, the invention is not limited to guidance and use on agricultural vehicles alone.

Figure 1B:
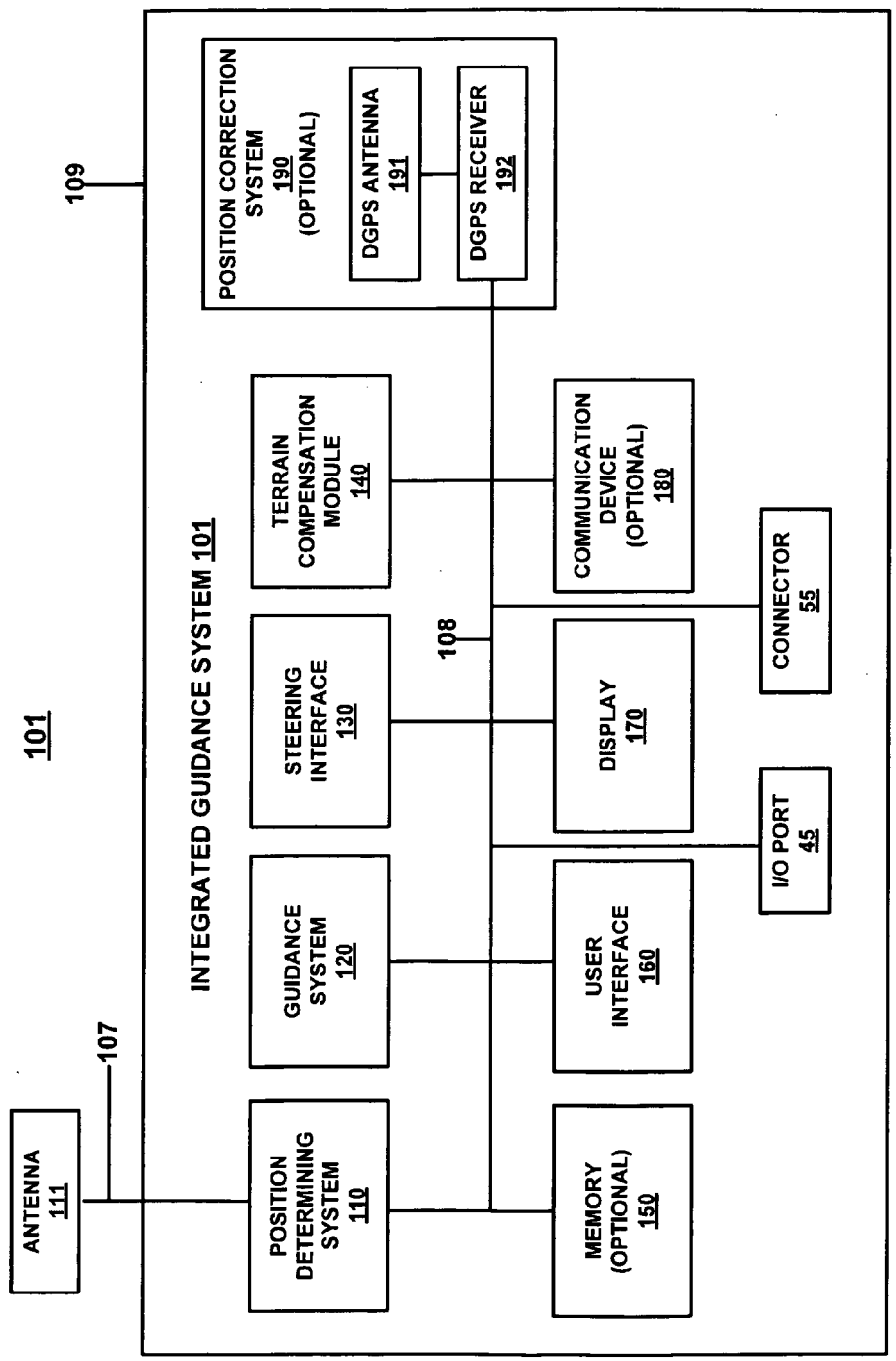
FIG. 1B is a block diagram of an exemplary integrated guidance system in accordance with embodiments of the present invention.

FIG. 1B illustrates a block diagram of an integrated guidance system 101 in accordance with an embodiment of the present invention. In embodiments of the present invention, the integrated guidance system 101 can be mounted on the dash, windshield, or ceiling of a vehicle such as, a tractor. In one embodiment, integrated guidance system 101 is integrated with steering component 102 which may be coupled with the steering column or steering shaft of the vehicle being controlled.

Referring to FIG. 1B, the integrated guidance system 101 includes a position determining system (PDS) 110, a guidance system 120, and a steering interface 130 which are coupled via a bus 108. Additionally, a terrain compensation module (TCM) 140, an optional memory 150, and a user interface 160 are coupled with bus 108. Also, a display 170, an optional communication device 180, and an optional position correction system 190 are coupled with bus 108. In the embodiment of FIG. 1B, these components are disposed within a housing 109. Input/output (I/O) port 45 and connector 55 facilitate communicatively coupling integrated guidance system 101 with other components such as steering component 102.

In one embodiment of the present invention, position determining system 110 is a satellite based position determining system and receives navigation data from satellites via antenna 111. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

In the embodiment of FIG. 1B, position determining system 110 utilizes a process of triangulation from several satellites, which are transmitting position determination signals, to determine the current position of the vehicle. The position determining system 110 is coupled with antenna 111 via coupling 107. As shown in FIG. 1B, antenna 111 is disposed outside of housing 109 to facilitate mounting antenna 111 outside of the vehicle (e.g., mounted on the roof of the vehicle) if, for example, the received GPS signals from the GPS satellites are not be strong enough inside the vehicle. However, in embodiments of the present invention, antenna 111 may also be disposed within housing 109. It should be understood that the position determining system 110 can be implemented to utilize position determination signals from other satellite-based systems, land-based systems, or hybrid (satellite-land) systems as well.

The accuracy of the current position of the vehicle determined by the position determining system 110 depends on factors such as time of the day, number of GPS satellites available, atmospheric conditions, accuracy of the components, etc. These factors can introduce errors in the determination of the current position of the vehicle.

A process known as differential correction can correct many of these errors. Differential GPS is an enhanced form of GPS. Differential GPS positions are more accurate than regular GPS positions. Differential GPS positions are regular GPS positions that have been corrected for atmospheric conditions and/or other errors using the process of differential correction. Typically, differential correction uses a GPS reference station, such as a GPS station that has a well-known location, to provide corrections for other GPS receivers that are at unknown locations (such as on a vehicle).

Differential corrections may be applied second-by-second in real time. These are known as real-time differential corrections. Alternatively, differential corrections may also be stored in electronic files and accessed later.

There are many sources of differential corrections. These sources include a short-range radio link from a local GPS reference station, a medium-range radio link from maritime or land-based beacons, and geo-stationary satellites. Geo-stationary satellites use multiple land-based reference stations to create a differential correction map over very large areas of the earth. One of these systems is the Wide Area Augmentation System (WAAS).

In an embodiment of the present invention, differential correction capability is integrated into the position determining system 110 of FIG. 1B. In the embodiment shown in FIG. 1B, the optional position correction system 190 provides the differential correction capability. As described above in an embodiment of the present invention, the position determining system 110 utilizes satellites of the Global Positioning System. Thus, the position correction system 190 includes a Differential Global Positioning System (DGPS) receiver 192 for correcting errors in the GPS position using GPS differential corrections, a DGPS antenna 191 for receiving GPS differential correction signals. In embodiments of the present invention, DGPS antenna 191 and DGPS receiver 192 may be coupled via an cable to facilitate positioning DGPS antenna 191 outside of the vehicle or, as shown in FIG. 1B, disposed within housing 109.

In embodiments of the present invention, guidance system 120 is coupled with a steering interface 130 via bus 108. However, it is appreciated that in embodiments of the present invention, guidance system 120 and steering interface 130 may be implemented as a single unit, or separately as shown in FIG. 1B.

In embodiments of the present invention, guidance system 120 uses position data from position determining system 110, user input such as a desired pattern or direction, as well as vector data such as desired direction and distance to determine course corrections which are used for guiding a vehicle. Roll, pitch, and yaw data from TCM 140 may also be used to determine course corrections for the vehicle. In embodiments of the present invention, guidance system 120 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with the vehicle. For example, if a harvester can clear a swath of 15 feet in each pass, guidance system 120 may generate steering commands which cause the harvester to move 15 feet to one side in the next pass. Guidance system 120 may also be programmed to follow straight or curved paths which is useful when operating in irregularly shaped or contoured fields, in fields disposed around a center pivot, or when following a road. This is also useful in situations in which the path being followed by the vehicle is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide the vehicle in these conditions.

In embodiments of the present invention, position determining component 110 may be integrated with guidance system 120, or may be a separate unit. In embodiments of the present invention, computer readable instructions for position determining system 110, guidance system 120, and/or steering interface may be executed by a single processor (not shown) or by discreet processors comprising the separate components. Additionally, as stated above with reference to FIG. 1, position determining component 110, control component 120 and steering component 102 may be integrated into a single unit in embodiments of the present invention.

In embodiments of the present invention, the course correction calculated by guidance system 120 is sent from guidance system 120 to steering interface 130.

Steering interface 130 translates the course correction generated by guidance system 210 into a steering command for manipulating the steering mechanism of the vehicle being controlled. In embodiments of the present invention, steering component 102 comprises a shaft encoder which facilitates determining the angle at which the front wheels and/or steering wheels of the vehicle are pointed. This provides feedback to guidance system 210 to more accurately position the front wheels in the location and angle that is necessary to guide the vehicle in a desired direction. Steering interface 130 generates a message conveying the steering command to steering component 102. In embodiments of the present invention, the communicative coupling between guidance system 120, steering interface 130 and steering component 102 is accomplished using coupling 105 (e.g., a direct electrical control, a serial bus, or CAN bus). In embodiments of the present invention, the direct electrical control may comprise a coupling for providing current to steering component to control the rotation of an electrical motor to facilitate steering a vehicle.

In embodiments of the present invention, steering component 102 may comprise an electric steering component, or a hydraulic steering component. Thus, steering interface 130 may comprise a first output (not shown) for coupling steering interface 130 with an electric steering component, and a second output (not shown) for coupling steering interface 130 with a hydraulic steering component. Because coupling 105 may be compliant with the CAN protocol, plug and play functionality is facilitated in system 100. Therefore, in embodiments of the present invention, steering interface 130 can determine which steering component it is coupled with depending upon which output of steering interface 130 is used.

Steering interface 130 then generates a message, based upon the steering component with which it is coupled, which causes the steering component to actuate the steering mechanism of the vehicle. For example, if steering interface 130 determines that the output for an electric steering component is being used, it generates a steering command which is formatted for controlling the electric steering component. If steering interface 130 determines that the output for the hydraulic steering component is being used, it generates a steering command which is formatted for controlling the hydraulic steering component.

TCM 140 provides the ability to compensate for terrain variations which can reduce the precision of position determining system 110 in determining the geographic position of a vehicle. For example, when traversing a hillside, the antenna 111 can be displaced to one side or the other with respect to the center line of the vehicle, thus causing errors in determining the geographic position of the vehicle. As a result, gaps or overlaps can occur when plowing across contoured terrain is being performed. TCM 140 can detect the magnitude of displacement of antenna 111 with respect to the center line of the vehicle (e.g., due to roll, pitch, and yaw) and send signals which allow guidance system 120 to generate steering commands which compensate for the errors in determining the geographic position of the vehicle. In embodiments of the present invention, TCM 140 may utilize gyroscopes, accelerometers, tilt sensors, rotation sensors, and the like to determine the displacement of antenna 111 from a first position to a second position with respect to the centerline of the vehicle.

Because integrated guidance system 101 may be coupled with a vehicle using, for example, suction cups, it may be beneficial to calibrate TCM 140 prior to operating system 100. For example, if integrated guidance system 101 is tilted when the system is started up, a bias may be induced which prevents TCM 140 from accurately determining the offset of antenna 111 from the centerline of the vehicle. In one embodiment, a circular level may be fixedly mounted in the vehicle in a location which can be seen by the vehicle operator. The vehicle can be parked at a level area and the circular level adjusted to indicate that the vehicle is level. The mounting hardware for the circular level can then be tightened to prevent the circular level from being tilted. A second circular level can be mounted on integrated guidance system 101. When the circular level in the vehicle shows that the vehicle is parked in a level area, a user can manually change the mounting angle of integrated guidance system 101 so that the circular level mounted thereupon indicates that the integrated guidance system is also level.

In another embodiment, the levels indicate the magnitude of the tilt of the vehicle of the integrated guidance system 101. When the level mounted in the vehicle indicates, for example, a tilt of five degrees to the left, the vehicle operator can tilt integrated guidance system five degrees to the left as well. As a result, both the vehicle and integrated guidance system 101 are tilted in a similar direction and magnitude.

In another embodiment, an electronic auto-level (not shown) may be coupled or built into integrated guidance system 101 which automatically removes bias induced by the mounting angle of integrated guidance system 101. To check whether tilt-induced bias has been removed, an operator can drive the vehicle over the same ground in opposite directions. If there is no tilt-induced bias, the wheels of the vehicle should substantially traverse the same wheel tracks as in the previous pass. If there is a mis-alignment of integrated guidance system 101 due to tilt, antenna 111 will not be in the expected position. As a result, the vehicle will follow different paths when successive passes are made across the same ground.

In embodiments of the present invention, optional memory 150 can be used to log or record information such as field boundaries, road pathways, or where the vehicle has previously gone. This is useful because, in order to comply with environmental regulations, records must be kept regarding the application of chemicals or fertilizers to, for example, farm fields. Embodiments of the present invention facilitate logging this information for later retrieval. In embodiments of the present invention, memory 150 may be remotely located from integrated guidance system 101. For example, communication device 180 may be a radio transceiver or cellular telephone device which can wirelessly transmit data from integrated guidance system 101 to a remotely located memory (e.g., via the Internet). In embodiments of the present invention, memory 150 may comprise a removable memory device (e.g., a universal serial bus (USB) memory device, or the like) which is can be communicatively coupled with integrated guidance system 101.

In embodiments of the present invention, display 170 comprises a display device (e.g., 171 of FIG. 2) for displaying text and graphics and/or a lightbar 172. In an embodiment, the display device 170 is a liquid crystal display (LCD). The display device 171 can be implemented with other display technologies. Moreover, the display device 171 is compact to minimize obstructing the vision of the operator and to reduce the size of the integrated guidance system 101. In an embodiment, the display device 171 has the dimensions 2.5 inches×3.5 inches. Operation of the display device 171 will be described in further detail below.

Lightbar 172 is adapted for providing a visual representation of a deviation of the current position of the vehicle from a desired path to guide an operator in controlling movement of the vehicle along the desired path. FIGS. 2, 11A, 11B, and 11C illustrate the lightbar 172 in accordance with an embodiment of the present invention. The lightbar 172 includes lights that are adapted to emit a light pattern that indicates the deviation of the vehicle from the desired path. It should be understood that the lightbar 172 can have configurations other than that shown in FIGS. 2, 11A, 11B, and 11C. Operation of the lightbar 172 will be described in further detail below.

In embodiments of the present invention, the user interface 160 is adapted for enabling an operator to access and interact with any one of the available functions of the integrated guidance system 101 with a minimum number of inputs and with minimum use of the inputs. An "input" refers to a button, key, switch, or any other electronic or mechanical means for a user to communicate information such as, for example, data, a command, a selection or a choice, to an electronic device. In an embodiment, the user interface 160 includes a first input, a second input, and a third input (e.g., 161, 162, and 163 of FIG. 3), providing a user-friendly manner of interacting with the integrated guidance system 101. In an embodiment, the first, second, and third inputs are buttons. In another embodiment, user interface 160 may comprise an alpha-numeric keypad and/or a device for controlling a cursor displayed upon display device 171. Examples of cursor control devices include, but are not limited to, a trackball, mouse, touch pad, joystick, or special keys on the alpha-numeric keypad. In other embodiments, a voice recognition system (not shown) may be used to facilitate input of commands without requiring a user to operate user interface with his/her hands.

In embodiments of the present invention, the first input, the second input, and the third input are conveniently positioned and integrated with respect to housing 109 for easy access by an operator. As a result, an operator can use without difficulty the integrated guidance system 101 while operating the vehicle, since distractions (e.g., too many inputs to select, position of the inputs is not convenient, need for visual assistance to distinguish inputs, etc.) originating from using the user interface by other guidance systems are significantly reduced. Operation of the user interface 160 will be described in greater detail below.

In embodiments of the present invention, integrated guidance system 101 can be upgraded via the I/O port 45. Moreover, data can be download/uploaded via the I/O port 45. In an embodiment, the I/O port 45 is a serial port. The integrated guidance system 101 can have one or more I/O ports 45. In one embodiment coupling 105 is coupled with integrated guidance system 101 via I/O port 45.

Figure 2:
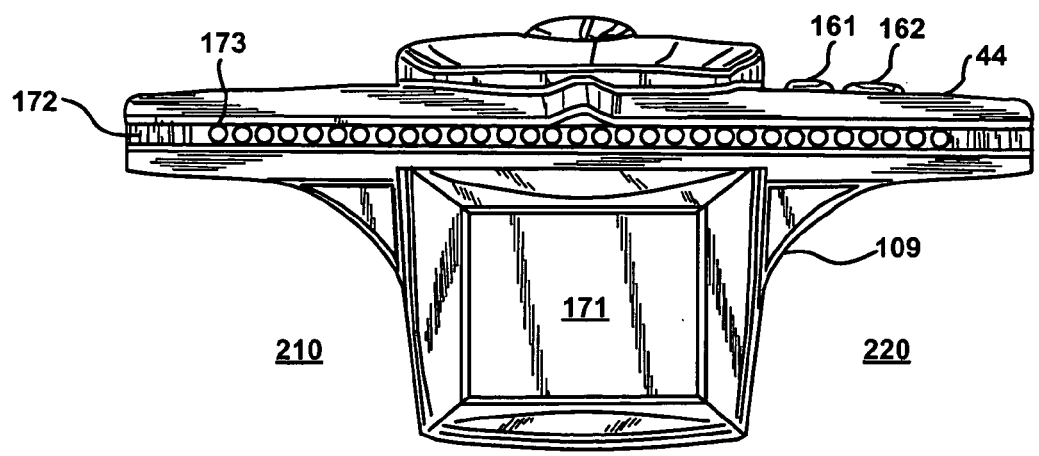
FIG. 2 is a front view of an integrated guidance system in accordance with an embodiment of the present invention.

FIG. 2 illustrates a front elevational view of an integrated guidance system 100 in accordance with an embodiment of the present invention. It should be understood that the integrated guidance system 101 can have other configurations. The display device 171, the lightbar 172, and housing 109 are depicted in FIG. 2. The housing 109 is rugged and has several features that benefit the operator of the vehicle. Area 210 and area 220 are not blocked by the housing 109, reducing visual obstruction as the operator operates the vehicle and utilizes the integrated guidance system 100. Moreover, the first, second, and third inputs 161, 162, and 163 (not shown) of the data input device are positioned on a top surface 44 of the housing 109. In an embodiment, the first, second, and third inputs 161, 162, and 163 (not shown) are buttons 161–163.

The lightbar 172 includes a plurality of lights 173 that are adapted to emit a light pattern that indicates the deviation of the vehicle from the desired path. Also, the lights 173 are spaced apart and are aligned in a row. The light pattern is formed by selectively illuminating particular ones of the lights 173. In an embodiment, the lights 173 are light emitting diodes (LED's). In an embodiment, several colors are visible when the plurality of lights 173 are illuminated. For example, a first quantity of lights 173 emit a first color, a second quantity of lights 173 emit a second color, a third quantity of lights 173 emit a third color, and so on. Examples of these colors include red, green, and yellow. In embodiments of the present invention, a user can select display modes for lightbar 172. For example, in one embodiment, the user can configure integrated guidance system 101 so that lightbar 172 shows the direction in which the vehicle is deviating from a desired direction. Thus, if the vehicle is drifting to the left of a desired direction, a quantity of lights 173 to the left of the center of lightbar 172 will be illuminated. In embodiments of the present invention, as the vehicle drifts farther to the left of the desired direction, lights farther to the left of lightbar 172 will be illuminated. To correct for this drift, the user could then manually steer away from the direction of the illuminated lights. In another embodiment, the user can configure integrated guidance system 101 so that lightbar 172 shows the direction which the user should steer toward in order to correct a deviation from the desired direction. For example, if the vehicle is drifting to the left of the desired direction, a quantity of lights 173 to the right of the center of lightbar 172 will be illuminated. To correct for this drift, the user could then manually steer toward the direction of the illuminated lights. Again, in embodiments of the present invention, as the vehicle drifts farther to the left of the desired direction, lights farther to the right of lightbar 172 will be illuminated.

Figure 3:
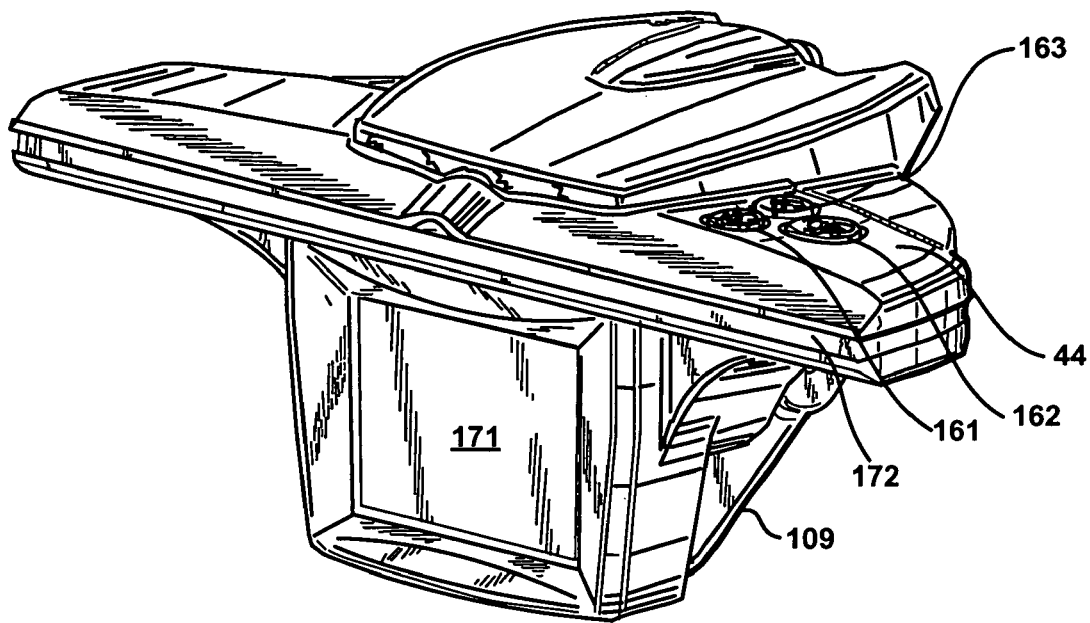
FIG. 3 is an upper right frontal perspective view of an integrated guidance system in accordance with an embodiment of the present invention.

FIG. 3 illustrates an upper right frontal perspective view of an integrated guidance system 100 in accordance with an embodiment of the present invention. The display device 171, the lightbar 172, the buttons 161–163, and the housing 109 are shown. The buttons 161–163 are positioned on top surface 44 of the housing 109 for convenient access by the operator. The lights (e.g., 173 of FIG. 2) of the lightbar 172 are not visible from this perspective view because the lights (e.g., 173 of FIG. 2) are located at an interior position that is out of the scope of this perspective view.

Figure 4:
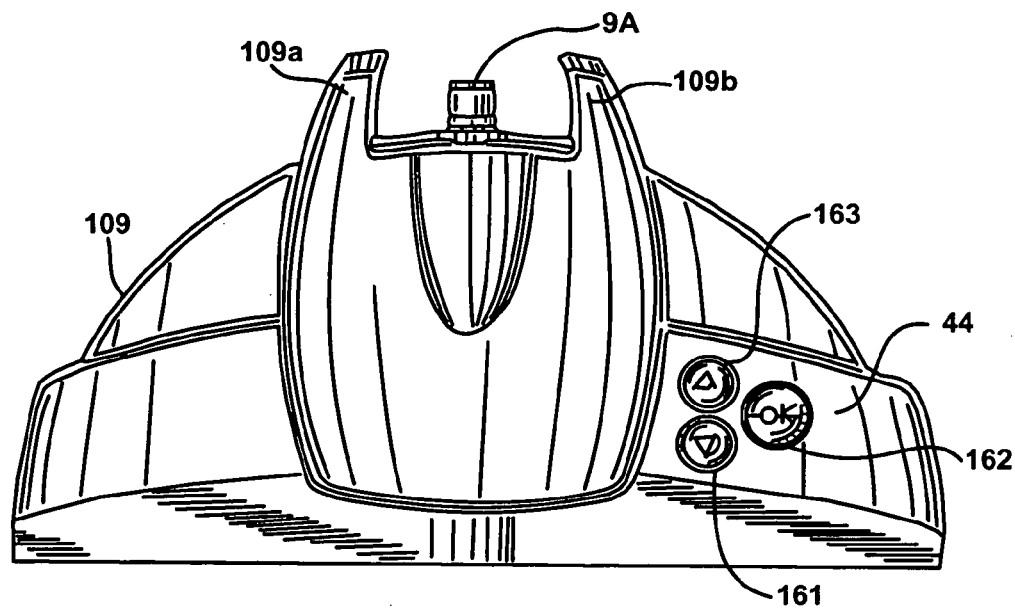
FIG. 4 is a top plan view of an integrated guidance system in accordance with an embodiment of the present invention.

Continuing to FIG. 4, a top plan view of an integrated guidance system 100 in accordance with an embodiment of the present invention is illustrated. The buttons 161–163, the housing 109, a top surface 44 of the housing 109, and a connector 9A for the cable that couples the GPS receiver and the GPS antenna are shown in FIG. 4. Buttons 161 and 163 are smaller than button 162. Moreover, the housing 109 has a first wing-shaped portion 109a and a second wing-shaped portion 109b. The first wing-shaped portion 109a and the second wing-shaped portion 109b protect the connector 9A that extends from a rear surface of the housing 109, increasing the reliability of the integrated guidance system 100.

Figure 5:
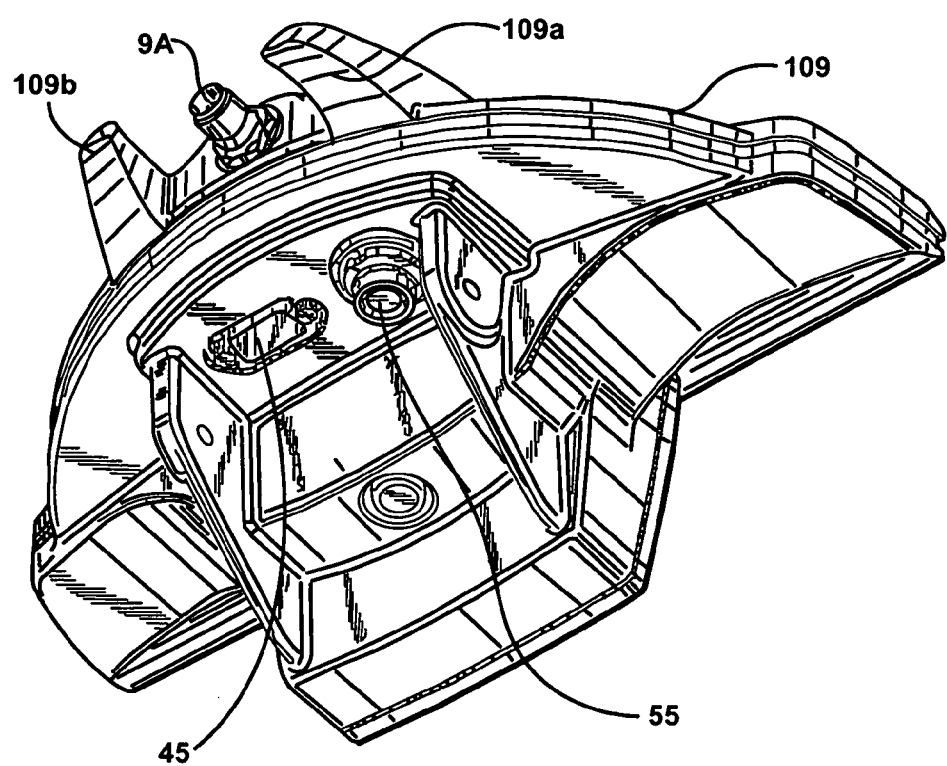
FIG. 5 is a lower left rear perspective view of an integrated guidance system in accordance with an embodiment of the present invention.

A lower left rear perspective view of an integrated guidance system 100 in accordance with an embodiment of the present invention is illustrated in FIG. 5. The housing 109, the I/O port 45, the first wing-shaped portion 109a, the second wing-shaped portion 109b, and the connector 9A for the cable that couples the GPS receiver and the GPS antenna are shown in FIG. 5. Moreover, the connector 55 can be utilized for one of various uses. The I/O port 45 and the connector 55 are positioned on a bottom surface of the housing 109.

Figure 6:
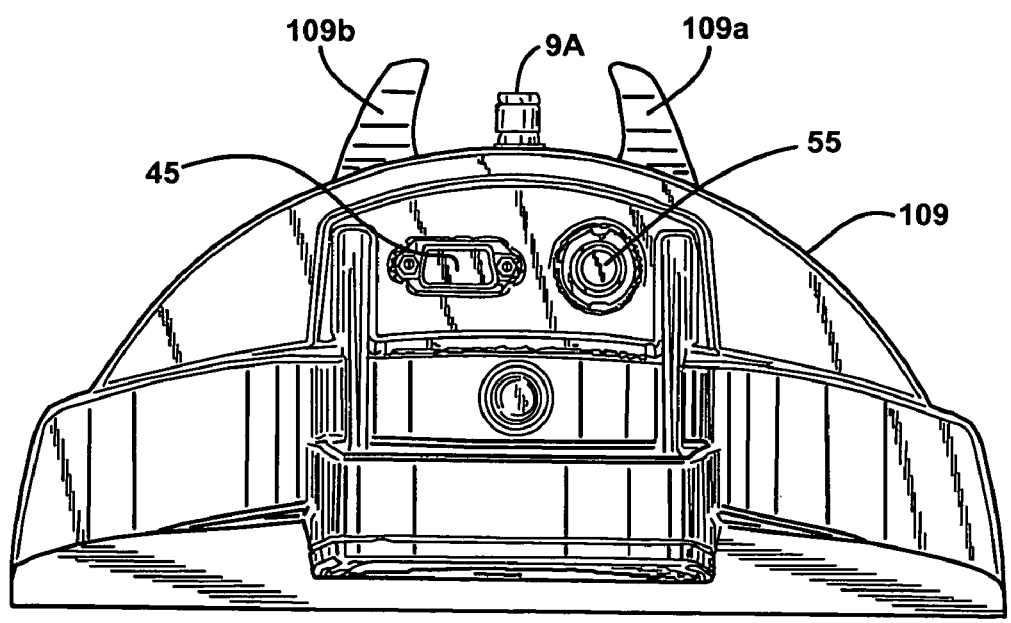
FIG. 6 is a bottom view of an integrated guidance system in accordance with an embodiment of the present invention.
Figure 7:
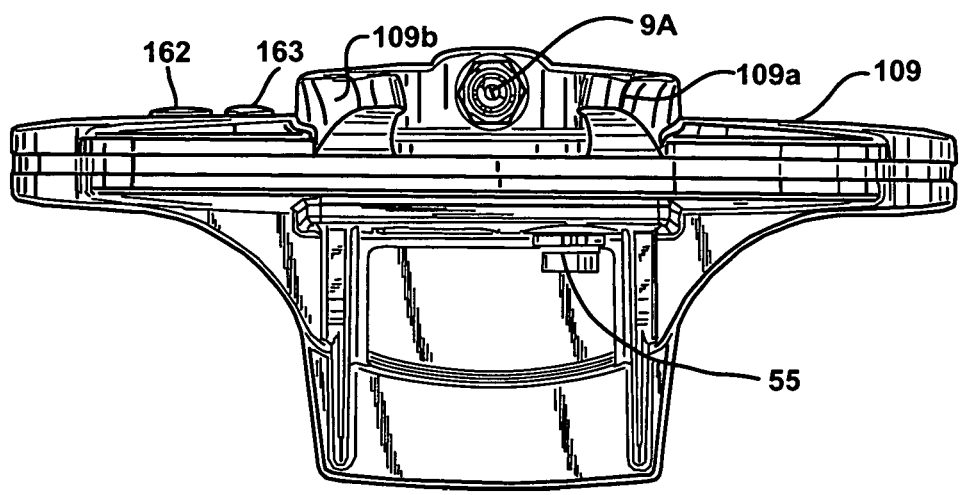
FIG. 7 is a rear view of an integrated guidance system in accordance with an embodiment of the present invention.

FIG. 6 illustrates a bottom plan view of an integrated guidance system 100 in accordance with an embodiment of the present invention. The housing 109, the I/O port 45, the first wing-shaped portion 109a, the second wing-shaped portion 109b, the connector 55, and the connector 9A for the cable that couples the GPS receiver and the GPS antenna are shown in FIG. 6. FIG. 7 illustrates a rear elevational view of an integrated guidance system 100 in accordance with an embodiment of the present invention. The housing 109, the connector 55, buttons 162 and 163, the first wing-shaped portion 109a, the second wing-shaped portion 109b, and the connector 9A for the cable that couples the GPS receiver and the GPS antenna are shown in FIG. 7.

Figure 8:
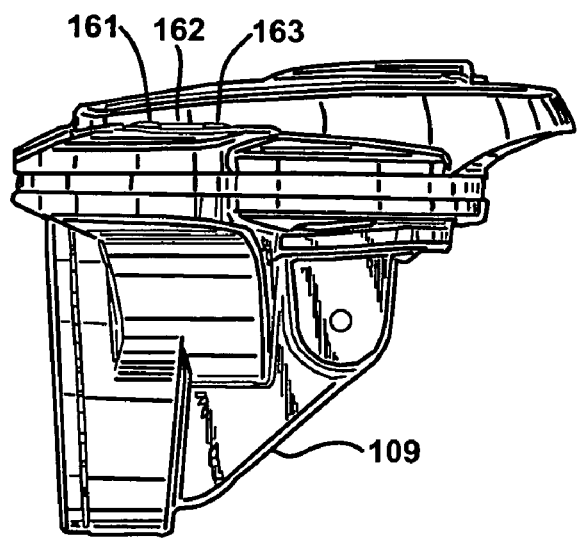
FIG. 8 is a right side elevational view of an integrated guidance system in accordance with an embodiment of the present invention.
Figure 9:
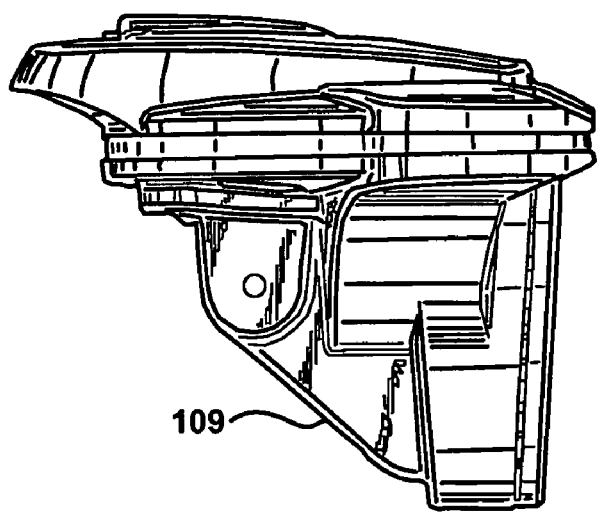
FIG. 9 is a left side view of an integrated guidance system in accordance with an embodiment of the present invention.

A right side elevational view of an integrated guidance system 100 in accordance with an embodiment of the present invention is illustrated in FIG. 8, showing the housing 109 and buttons 161–163. Furthermore, FIG. 9 illustrates a left side elevational view of an integrated guidance system 100 in accordance with an embodiment of the present invention, showing the housing 109.

Figure 10:
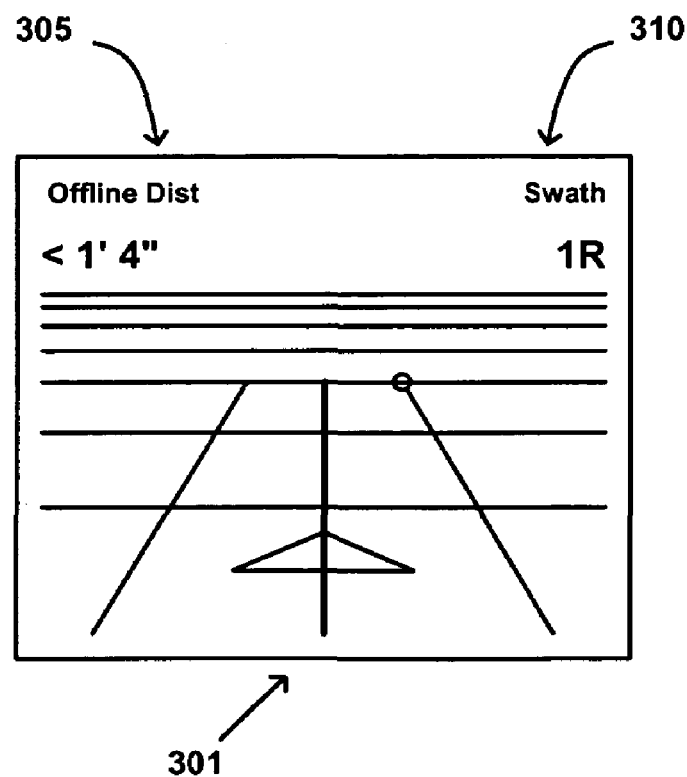
FIG. 10 is an exemplary screen that is displayed on a display device of an integrated guidance system in accordance with an embodiment of the present invention.

FIG. 10 illustrates an exemplary screen 1000 that is displayed on the display device 171 of an integrated guidance system 100 in accordance with an embodiment of the present invention. As depicted in FIG. 10, the exemplary screen 1000 includes text and graphics. A perspective view graphic 301 to assist in guiding the operator covers a portion of the exemplary screen 1000 while text 305 that indicates the deviation of the vehicle from the desired path and text 310 that describes the desired path cover another portion of the exemplary screen 1000. Moreover, the information (e.g., text and graphics) on the exemplary screen 1000 is designed to be viewable under various light conditions (e.g., in sunlight or in the middle of the night). Moreover, the operator is able to vary the contrast and brightness by using the buttons 161–163 to interact with the user interface of the integrated guidance system 100.

Figure 11A:
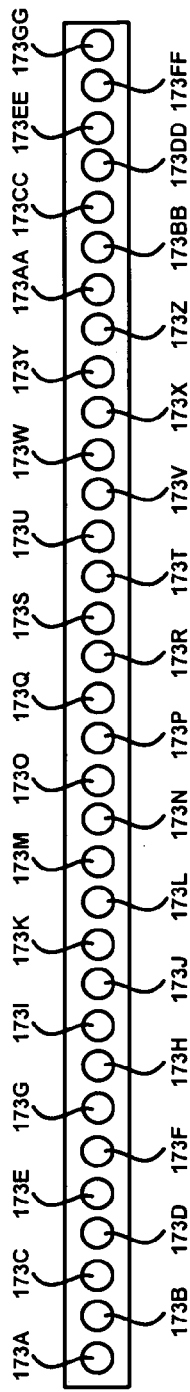
FIG. 11A is an exemplary lightbar of an integrated guidance system in accordance with an embodiment of the present invention.

FIG. 11A illustrates a lightbar 172 of an integrated guidance system 100 in accordance with an embodiment of the present invention. As illustrated in FIG. 11A, the lightbar 172 includes a plurality of lights 173A–173GG that are adapted to emit a light pattern that indicates the deviation of the vehicle from the desired path. Also, the lights 173A–173GG are spaced apart and are aligned in a row. The light pattern is formed by selectively illuminating particular ones of the lights 173A–173GG. In an embodiment, the lights 173A–173GG are light emitting diodes (LED's). In an embodiment, several colors are visible when the plurality of lights 173A–173GG are illuminated.

The lightbar 172 gives the operator guidance feedback via the lights 173A–173GG that indicate to the operator the deviation (distance to the left or right of the desired path) of the desired direction that the vehicle is traveling. The aim is to operate the vehicle so that the light pattern of the lightbar 172 is formed by illumination of the center lights (e.g., 173P, 173Q, and 173R) of the lightbar 172. In an embodiment, the center lights 173P–173R are green LED's. Lightbar 172 provides feedback that steering component 102 is operating correctly. For example, under most conditions, when a course correction is necessary, this will be detected by integrated guidance system 101 which then generates commands to steering component 102. As a result, the course correction will be performed without the necessity of user intervention. However, if the system should unexpectedly fail, lightbar 172 will indicate that the vehicle is deviating from the desired direction. When the operator notices that lightbar 172 is indicating a deviation from the desired direction of a sufficient magnitude, the user can manually steer the vehicle to affect a course correction.

Figure 11B:
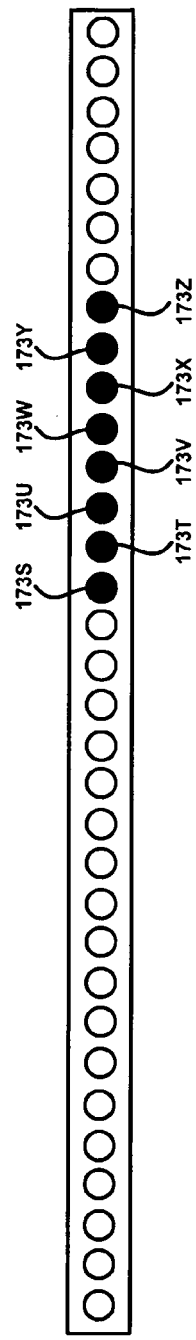
FIG. 11B is an exemplary light pattern emitted by a lightbar of an integrated guidance system in accordance with an embodiment of the present invention.

FIG. 11B illustrates a first light pattern 1700 emitted by a lightbar 172 of an integrated guidance system 101 in accordance with an embodiment of the present invention. The first light pattern 1700 is formed by the illumination of lights 173S–173Z. In an embodiment, the lights 173S–173Z are red LED's. As described above with reference to FIG. 2, this may indicate to the operator that the vehicle should be moved to the left to guide the vehicle in the desired direction. As the vehicle moves towards the left, another light pattern is formed. It should be understood that the first light pattern 1700 can also be configured to indicate that the operator has to move the vehicle to the right in order to reduce the deviation from the desired path.

Figure 11C:
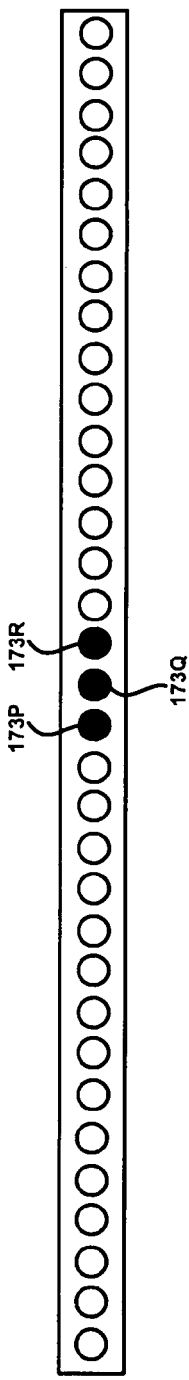
FIG. 11C is an exemplary light pattern emitted by a lightbar of an integrated guidance system in accordance with an embodiment of the present invention.

Continuing with FIG. 11C, a second light pattern 1710 emitted by a lightbar 172 of an integrated guidance system 101 in accordance with an embodiment of the present invention is illustrated. The second light pattern 1710 is formed by the illumination of lights 173P–173R. Here, the second light pattern 1710 is centered, indicating that the vehicle is moving in the desired direction. Thus, a correction in the movement of the vehicle is not necessary.

Figure 12A:
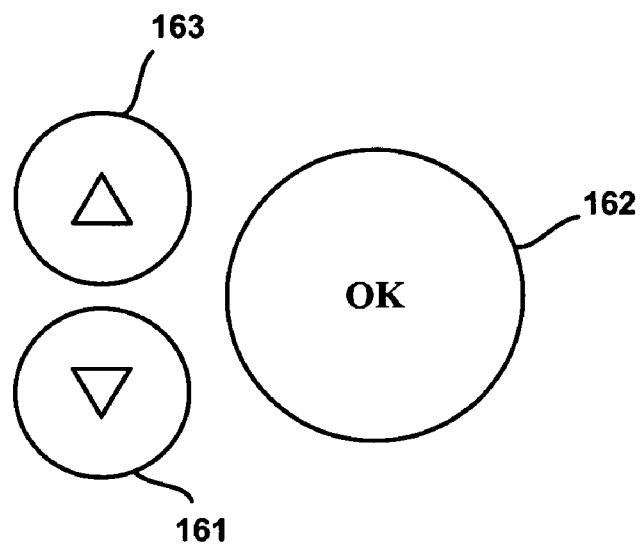
FIG. 12A shows an exemplary user interface of an integrated guidance system in accordance with an embodiment of the present invention.

FIG. 12A illustrates a plurality of inputs 161–163 of a user interface 160 of an integrated guidance system 101 in accordance with an embodiment of the present invention. In an embodiment, the inputs 161–163 are buttons 161–163. The buttons 161–163 and the user interface of the integrated guidance system 101 enable intuitive and simple interaction by the operator with the integrated guidance system 101. The buttons 161–163 and the user interface of the integrated guidance system 101 enable the operator to access and interact with any one of the available functions of the integrated guidance system 101 with a minimum number of buttons 161–163 and with minimum use of the buttons 161–163.

The following discussion provides exemplary use of buttons 161–163 when the integrated guidance system 101 is utilized in agriculture by operators of agricultural vehicles and equipment. When the integrated guidance system 101 is in guidance mode, the button 162 (or OK) is pressed to set the A and B points of various guidance patterns. When the integrated guidance system 101 is in boundary mapping mode, the button 162 (or OK) is pressed to start the boundary mapping and to stop the boundary mapping. When the integrated guidance system 101 is in a screen, menu item, or edit screen, the button 162 (or OK) is pressed to select/accept based on screen/menu item context. The button 161 (or down arrow) is pressed to go to the next screen or menu item. Moreover, in the edit screen, the button 161 (or down arrow) is pressed to decrease a value in that edit screen. The button 163 (or up arrow) is pressed to go to the previous screen or menu item. Moreover, in the edit screen, the button 163 (or up arrow) is pressed to increase a value in that edit screen.

Figure 12B:
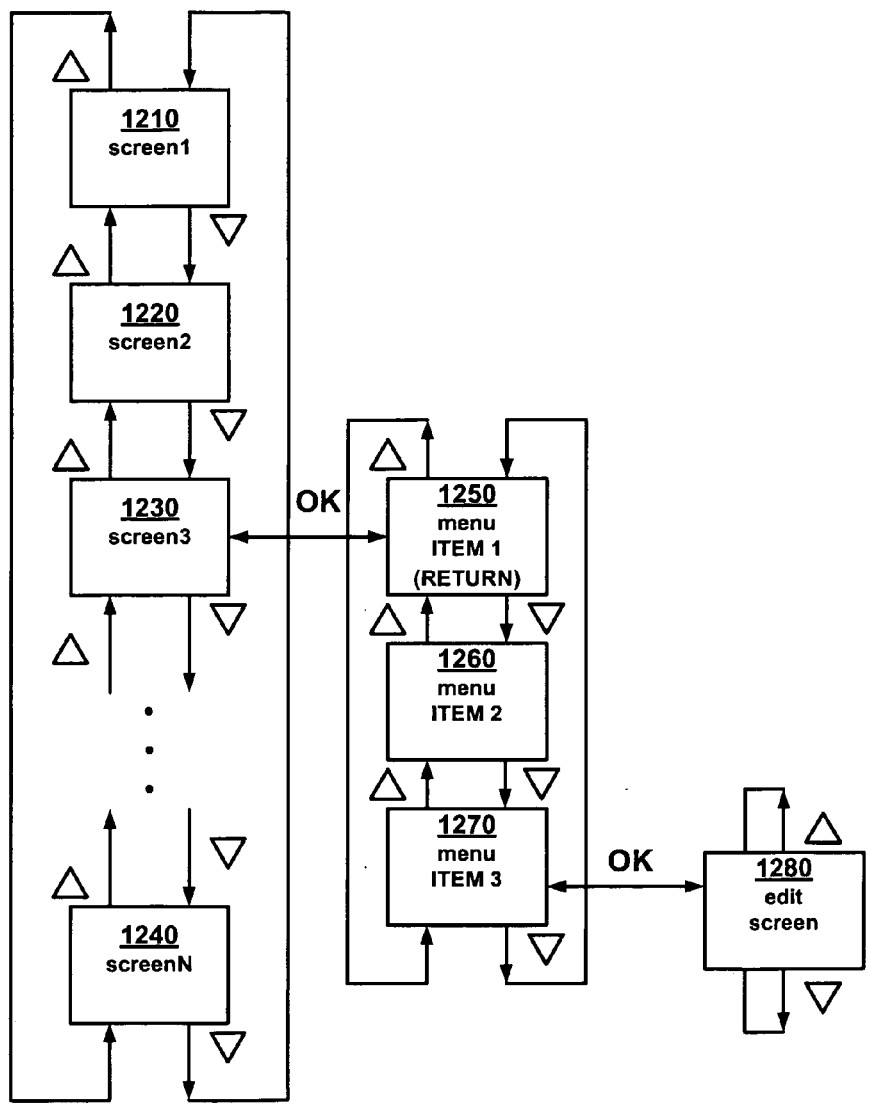
FIG. 12B is an exemplary flow chart showing the menu structure and user operation of an integrated guidance system in accordance with an embodiment of the present invention.

Furthermore, FIG. 12B illustrates an exemplary flow chart 1200 showing the menu structure and user operation of an integrated guidance system 101 using the buttons 161–163 of FIG. 12A in accordance with an embodiment of the present invention. The available functions of the integrated guidance system 101 are displayed in a menu-driven manner that is user friendly. The button 163 (or up arrow) and the button 161 (or down arrow) enable the operator to scroll or rotate through the screens (e.g., screens 1 1210–screenN 1240). If the button 162 (or OK) is pressed while in one of the screens (e.g., screen1 1210–screenN 1240), the operator is provided access to the menu items of the current screen. For example, if screen3 1230 is the configuration screen, the operator can then enter a configuration mode and access the configuration menu items (e.g., menu item1 1250–menu item3 1270). The button 163 (or up arrow) and the button 161 (or down arrow) enable the operator to scroll or rotate through the configuration menu items (e.g., menu item1 1250–menu item3 1270. The menu items (e.g., menu item1 1250–menu item3 1270) represent the available options for the operator to select and edit. Moreover, one of the configuration menu items (e.g., menu item1 1250–menu item3 1270) represents "return", enabling the operator to exit the configuration menu items (e.g., menu item1 1250–menu item3 1270) and return to the screens (e.g., screen1 1210–screenN 1240).

If the button 162 (or OK) is pressed while one of the menu items other than "return" (e.g., menu item2 1260 or menu item3 1270) is selected, the operator is able to edit the menu item in the edit screen 1280. Moreover, in the edit screen 1280, the button 161 (or down arrow) is pressed to decrease a value in that edit screen 1280. Additionally, in the edit screen 1280, the button 163 (or up arrow) is pressed to increase a value in that edit screen 1280. When finished editing, the operator presses the button 162 (or OK) to save the changes and return to the configuration menu items (e.g., menu item1 1250–menu item3 1270). Finally, the operator scrolls to the menu item1 1250, which represents "return", and presses the button 162 (or OK) to exit configuration mode and the configuration menu items (e.g., menu item1 1250–menu item3 1270) and to return to the screens (e.g., screen1 1210–screenN 1240).

Thus, the integrated guidance system 101 of the present invention overcomes the disadvantages of other guidance systems. The integrated guidance system 101 integrates the operation of various components for guidance applications, whereas the integration enables a single housing for the integrated guidance system 101. Moreover, the operator interaction with the integrated guidance system 100 is intuitive, simple, and safe under various conditions that the operator may encounter while operating the vehicle.

VEHICLE STEERING CONTROL EMBODIMENT

Figure 13A:
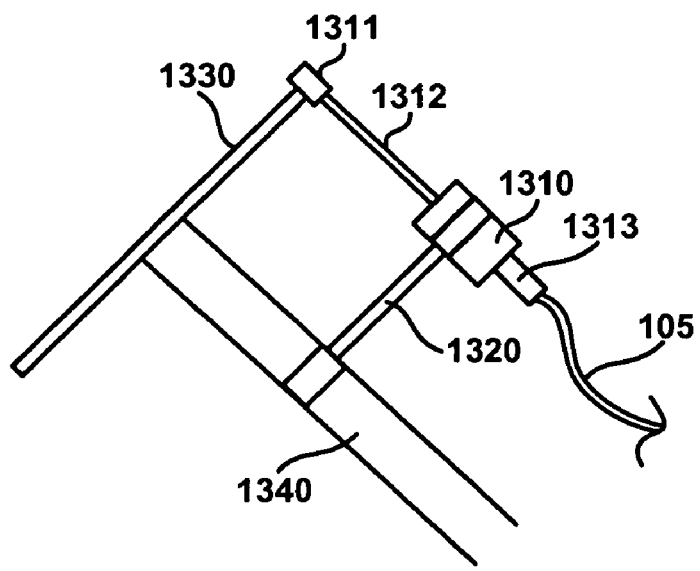
FIGS. 13A and 13B show side and top views respectively of a steering component used in accordance with embodiments of the present invention.
Figure 13B:
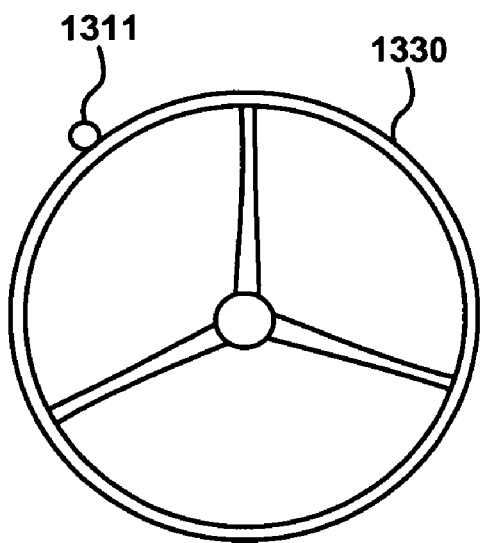

FIGS. 13A and 13B show side and top views respectively of a steering component 1300 for controlling a mobile machine in accordance with embodiments of the present invention. It is appreciated that steering component 1300 is representative of an embodiment of steering component 102 described above with reference to FIG. 1A. In the embodiment of FIG. 13A, a steering component 1300 comprises an electric motor 1310 which is coupled with an actuator device via a shaft 1312. In the embodiment of FIG. 13A, actuator device comprises a drive wheel 1311 which is in contact with steering wheel 1330 of the vehicle. In embodiments of the present invention, electric motor 1310 may be directly coupled with drive wheel 1311, or may be coupled via a low ratio gear (not shown). Using these methods to couple electric motor 1310 and drive wheel 1311 are advantageous in that a smaller electric motor can be used while still generating sufficient torque to control steering wheel 1330. Thus, if a user wants to manually steer the vehicle, the user will encounter less resistance from electric motor 1310 when it is disengaged.

Electric steering component 1300 further comprises a motor control unit 1313 which is coupled with electric motor 1310 and with steering interface 130 of FIG. 1B via coupling 105. In embodiments of the present invention, steering interface 130 may be an integrated component of motor control unit 1313 which is coupled with integrated guidance system 101 via coupling 105. Furthermore, while the present embodiment shows motor control unit 1313 and/or steering interface being integrated with electric motor 1310, in embodiments of the present invention they are implemented as discreet units. In FIG. 13A, electric motor 1310 is coupled with the steering column 1340 via a bracket 1320. It is appreciated that in embodiments of the present invention, electric motor 1310 may be coupled with the vehicle using another apparatus than bracket 1320. For example, in one embodiment, electric motor 1310 may be coupled with a bracket which is attached via suction cups with the windshield or dashboard of the vehicle. In another embodiment, electric motor 1310 may be coupled with a pole which is extended between the floor and roof of the vehicle. Furthermore, while the present embodiment shows motor control unit 1313 directly coupled with electric motor 1310, embodiments of the present invention are well suited to utilize other configurations. For example, in one embodiment motor control unit 1313 may be implemented as a sub-component of steering interface 130 of integrated guidance system 101 and may only send a control voltage to electric motor 1310 via an electrical coupling (not shown). In another embodiment, motor control unit 1313 may be implemented as a separate unit which is communicatively coupled with steering interface via coupling 105 and with electric motor 1310 via an electrical coupling (not shown).

In embodiments of the present invention, drive wheel 1311 is coupled with steering wheel 1330 with sufficient friction such that rotation of drive 1311 causes rotation of steering wheel 1330. In embodiments of the present invention, a spring (not shown) maintains sufficient pressure for coupling drive wheel 1311 with steering wheel 1330. However, the spring does not maintain sufficient pressure between drive wheel 1311 and steering wheel 1330 to pinch a user's fingers if, for example, the user is manually steering the vehicle and the user's fingers pass between drive wheel 1311 and steering wheel 1330.

In embodiments of the present invention, electric motor 1310 is reversable, thus, depending upon the steering command sent from steering interface 130, motor control unit 1313 controls the current to electric motor 1310 such that it rotates in a clockwise of counter-clockwise direction. As a result, steering wheel 1330 is turned in a clockwise or counter-clockwise direction as well. Typically, the current running through electric motor 1310 is calibrated so that drive wheel 1311 is turning steering wheel 1330 without generating excessive torque. This facilitates allowing a user to override electric steering component 1300. In embodiments of the present invention, electric motor 1310 may be a permanent magnet brush direct current (DC) motor, a brushless DC motor, a stepper motor, or an alternating current (AC) motor.

In embodiments of the present invention, motor control unit 1313 can detect when a user is turning steering wheel 1330 in a direction counter to the direction electric motor 1310 is turning. For example, a shaft encoder (not shown) may be used to determine which direction shaft 1312 is turning. As discussed above, the shaft encoder facilitates determining the angle at which the front wheels and/or steering wheels of the vehicle are pointed. This provides feedback to more accurately position the front wheels in the location and angle that is necessary to guide the vehicle in a desired direction. Additionally, when a user turns steering wheel 1330 in a direction which counters the direction electric motor 1310 is turning, the shaft encoder detects that the user is turning steering wheel 1330 and generates a signal to motor control unit 1313. In response to determining that a user is turning steering wheel 1330, motor control unit 1313 can disengage the power supplied to electric motor 1310. As a result, electric motor 1310 is now freewheeling and can be more easily operated by the user.

In another embodiment, when steering wheel 1330 is turned counter to the direction electric motor 1310 is turning, a circuit in motor control unit 1313 detects that electric motor 1310 is stalling and disengages the power supplied to electric motor 1310. In another embodiment, a switch detects the rotation of steering wheel 1330 and sends a signal to motor control unit 1313. Motor control unit 1313 can then determine that the user is manually steering the vehicle and disengage electric motor 1310. As a result, when a user turns steering wheel 1330, their fingers will not be pinched if they pass between drive wheel 1311 and steering wheel 1330 because electric motor 1310 is freewheeling when the power is disengaged. In another embodiment, one or more Hall effect sensors are disposed within electric motor 1310 and detect the magnetic pulses when an armature of electric motor 1310 is proximate to the sensor(s). As a result, the rotation of electric motor 1310 can be detected and used to determine the angle of the front wheels of the vehicle being controlled.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIGS. 13A and 13B can be easily bolted onto steering column 1340 and coupled with steering interface 130. Additionally, electric motor 1310 can be fitted to a variety of vehicles by simply exchanging bracket 1320 for one configured for a particular vehicle model.

Figure 14A:
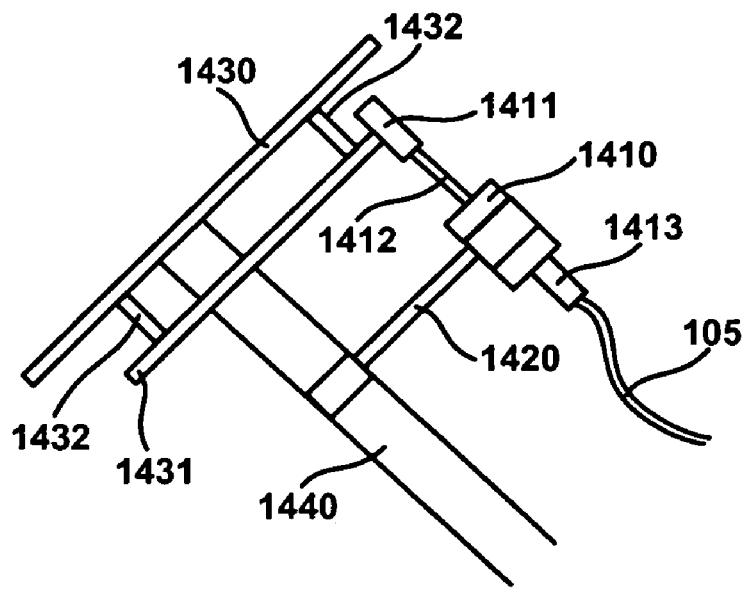
FIGS. 14A, 14B, and 14C show side and top views respectively of a steering component used in accordance with embodiments of the present invention.
Figure 14B:
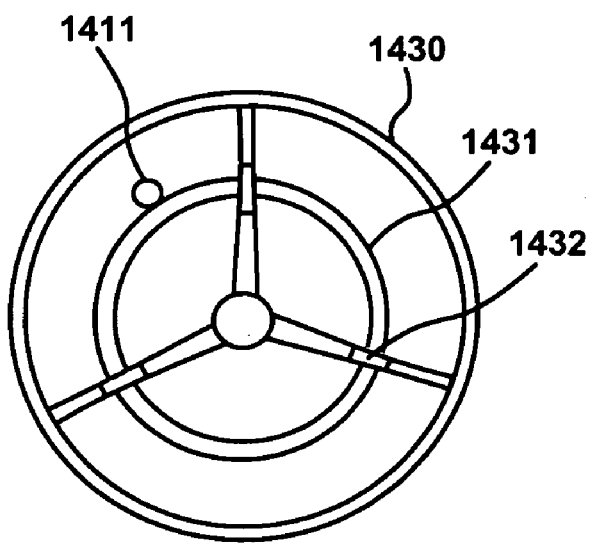
Figure 14C:
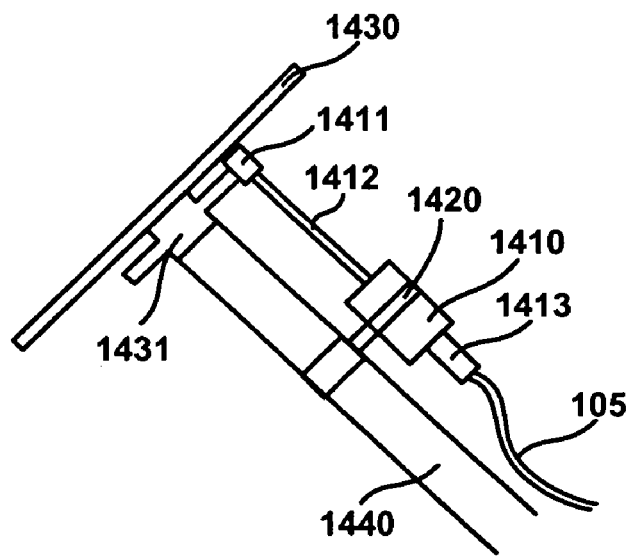

FIGS. 14A, 14B and 14C are views of a steering component 1400 for controlling a mobile machine in accordance with embodiments of the present invention. It is appreciated that steering component 1400 is representative of an embodiment of steering component 102 described above with reference to FIG. 1A. In FIG. 14A, the steering component 1400 comprises an electric motor 1410 which is coupled with drive wheel 1411 via shaft 1412 and a motor control unit 1413. Motor control unit 1413 couples electric motor 1410 with steering interface 130 of FIG. 1B via coupling 105. It is appreciated that in embodiments of the present invention, motor control-unit 1413 may be implemented as discussed above with reference to FIGS. 13A and 13B. In FIG. 14A, electric motor 1410 is coupled with steering column 1440 via bracket 1420. In the embodiment of FIGS. 14A and 14B, drive wheel 1411 is coupled with a sub wheel 1431 which is coupled with steering wheel 1430 via brackets 1432.

In the embodiment of FIGS. 14A and 14B, electric motor 1410 turns in a clockwise or counter-clockwise direction depending upon the steering command received by motor control unit 1413. As a result, drive wheel 1411 causes sub wheel 1431 to turn in clockwise or counter clockwise direction as well. Utilizing sub wheel 1431 prevents a user's fingers from being pinched between steering wheel 1430 and drive wheel 1411 if the user chooses to manually steer the vehicle. In embodiments of the present invention, sub wheel 1431 can be easily and quickly coupled with steering wheel 1430 by, for example, attaching brackets 1432 to the spokes of steering wheel 1430. As described above, in embodiments of the present invention, a shaft encoder or Hall effect sensor may be used to determine the direction in which the front wheels of the vehicle being controlled are pointed. FIG. 14C shows an alternate implementation of steering component 1400 in which sub wheel 1431 is coupled with and disposed between steering wheel 1430 and steering shaft 1450. The embodiment of FIG. 14C may be more desirable to some users who might find the use of brackets 1432 cumbersome. As described above with reference to FIGS. 14A and 14B, sub wheel 1431 is driven by drive wheel 1411 to control the steering mechanism of the vehicle.

Figure 15A:
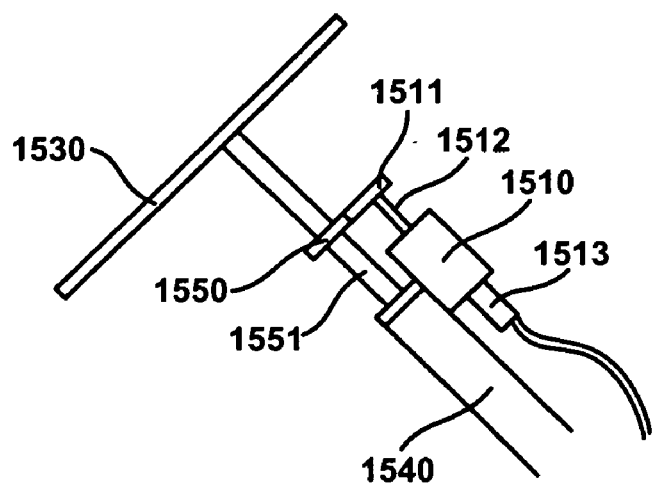
FIGS. 15A, 15B, and 15C show side and top views respectively of a steering component used in accordance with embodiments of the present invention.
Figure 15B:
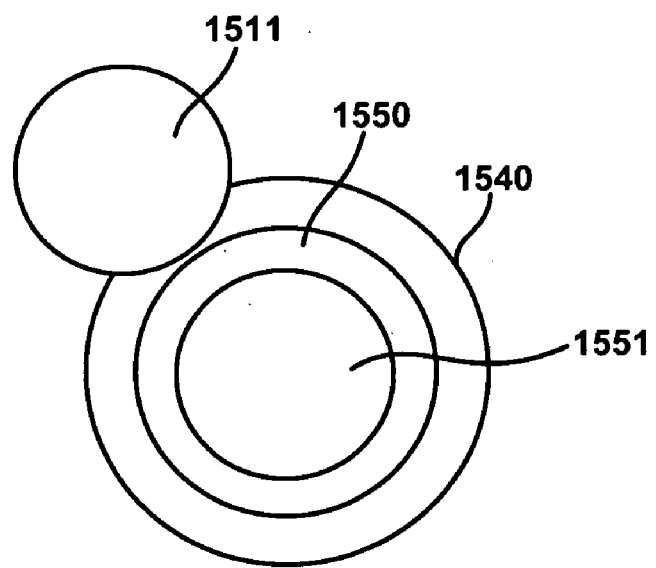
Figure 15C:
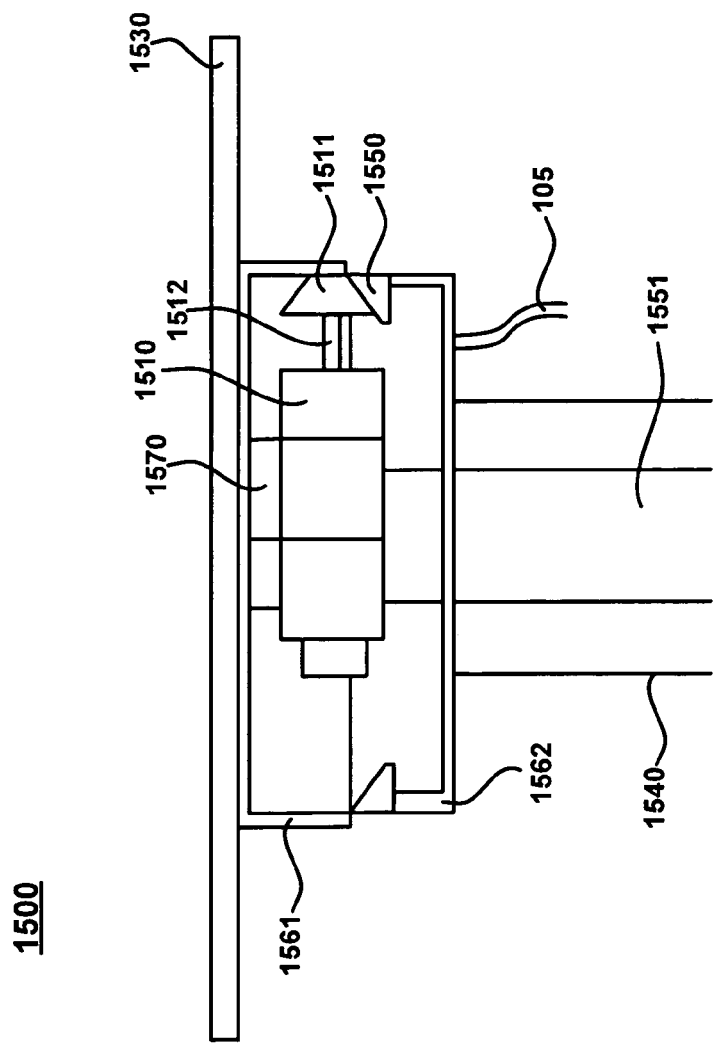

FIGS. 15A, 15B and 15C are views of a steering component 1500 for controlling a mobile machine in accordance with embodiments of the present invention. It is appreciated that steering component 1500 is representative of an embodiment of steering component 102 described above with reference to FIG. 1A. In FIG. 15A, the steering component 1500 comprises an electric motor 1510 which is coupled with gear 1511 via shaft 1512 and with a motor control unit 1513. Motor control unit 1513 couples electric motor 1510 with steering interface 130 of FIG. 1B via coupling 105. In FIG. 15A, electric motor 1510 is coupled with steering column 1540.

FIG. 15B is a section view of system 1500 and shows steering shaft 1550 disposed within steering column 1540. A gear 1551 couples steering shaft 1550 with gear 1511 of electric steering component 1500. In the present embodiment, electric motor 1510 turns in a clockwise or counter clockwise direction depending upon the steering command received by motor control unit 1513. As a result, gear 1511 also turns in a clockwise or counter clockwise direction, thus causing steering shaft 1551 to turn due to the force conveyed by gear 1550. While the present embodiment recites coupling steering component 1500 with steering shaft 1550 using gears, embodiments of the present invention are well suited for using other mechanical couplings such as a gear and chain, a belt and pulleys, etc. As described above, in embodiments of the present invention, a shaft encoder or Hall effect sensor may be used to determine the direction in which the front wheels of the vehicle being controlled are pointed.

In the embodiments of FIGS. 15A and 15B, electric motor 1510 is fixed with respect to steering column 1540. However, in another embodiment, as shown in FIG. 15C, electric motor 1510 is fixed with respect to steering wheel 1530. In FIG. 15C, a first housing 1561 is fixedly coupled with respect to steering wheel 1530. A second housing 1562 is fixedly coupled with respect to steering column 1540. Thus, first housing 1561 can be moved independently of second housing 1562.

Electric motor 1510 is coupled with first housing 1561 via bracket 1570 and with gear 1511 via shaft 1512. In the embodiment of FIG. 15C, gear 1550 is a concentric gear disposed inside of second housing 1562 and is engaged with gear 1511. In one embodiment, electrical power from coupling 105 can be supplied to electric motor 1510 using sliprings and brushes. Steering commands for motor control unit 1513 may be received, for example, via a wireless communication coupling.

In the embodiment of FIG. 15C, in response to a steering command, motor control unit 1513 actuates motor 1510, thus causing gear 1511 to turn in a clockwise counter-clockwise direction. Because gear 1511 is engaged with gear 1550, which is fixed with respect to steering column 1540, electric motor 1510 and first housing 1561 will rotate around the axis of steering shaft 1551 in response to actuating electric motor 1510. Additionally, while FIG. 15C shows electric motor 1510 disposed within first housing 1561, in embodiments of the present invention, electric motor 1510, shaft 1512, gear 1511, and gear 1550 may be disposed on the outside of first housing 1561 and second housing 1562 in embodiments of the present invention.

Figure 16:
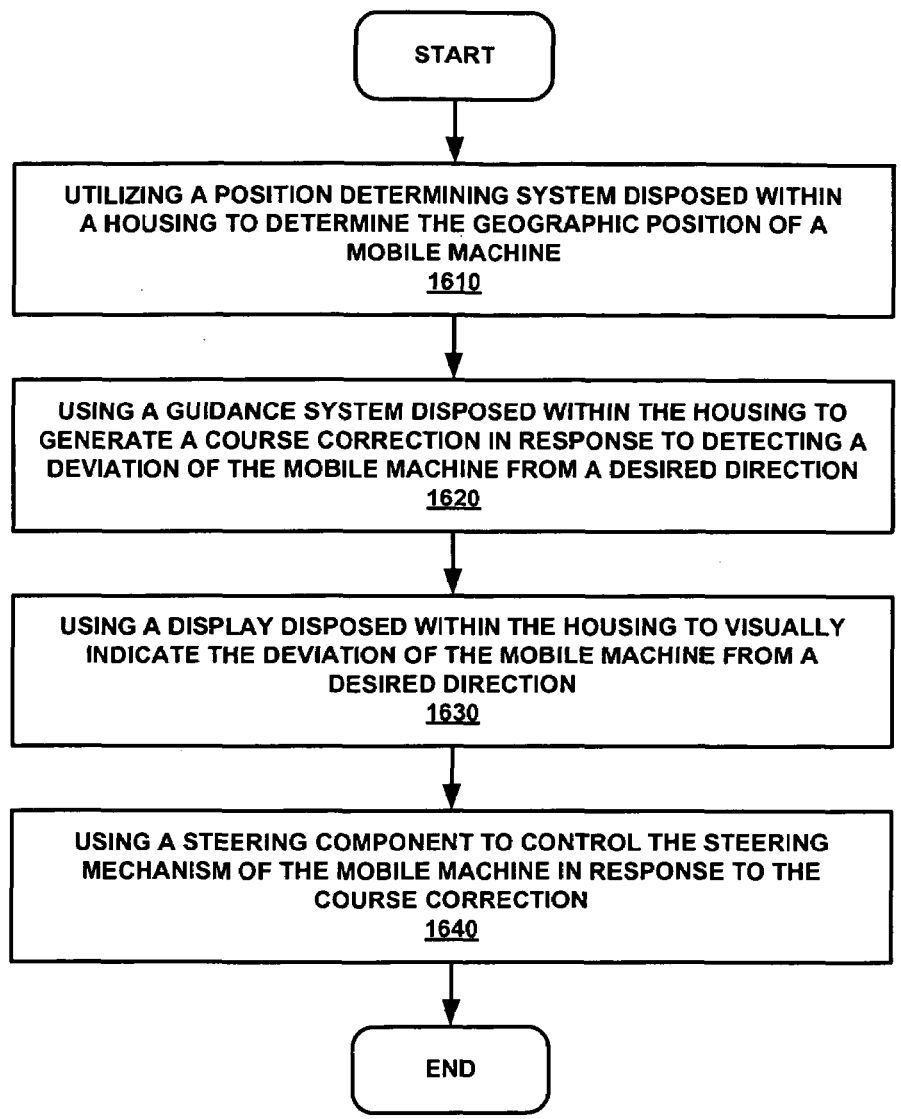
FIG. 16 is a flowchart of a method for controlling a mobile machine in accordance with embodiments of the present invention.

FIG. 16 is a flowchart of a method 1600 for controlling a mobile machine in accordance with embodiments of the present invention. In step 1610 of FIG. 16, a position determining system disposed within a housing is utilized to determine the geographic position of a mobile machine. As described above with reference to FIG. 1B, position determining system 110 may utilize a ground-based or satellite-based position determining system to determine the geographic position of a mobile machine.

In step 1620 of FIG. 16, a guidance system disposed within the housing is used to generate a course correction in response to detecting a deviation of the mobile machine from a desired direction. As described above with reference to FIG. 1B, guidance system 120 can determine when the mobile machine is deviating from a desired direction and generate a course correction for to change the direction of travel of the mobile machine from its present direction of travel to the desired direction of travel. In embodiments of the present invention, guidance system 120 is disposed in the same housing as position determining system 110.

In step 1630 of FIG. 16, a display disposed within the housing is used to visually indicate the deviation of the mobile machine from the desired direction. In embodiments of the present invention, display device 171 and/or lightbar 172 are used to visually indicate to an operator of the vehicle that the vehicle is not travelling in the desired direction of travel. In embodiments of the present invention display device 171 and/or lightbar 172 are disposed in the same housing as position determining system 110 and guidance system 120.

In step 1640 of FIG. 16, a steering component is used to control the steering mechanism of the mobile machine in response to the course correction. In embodiments of the present invention, steering component 102 is coupled with the steering mechanism of the mobile machine. In embodiments of the present invention, steering component 102 may be either a hydraulic steering component or an electric steering component.

The preferred embodiment of the present invention, a GPS receiver with autopilot and integrated lightbar display, is thus described. While the present invention has been described in particular embodiments, it should be appreciated that the present invention should not be construed as limited by such embodiments, but rather construed according to the following claims.

What is claimed is:

1. A system for controlling a mobile machine, said system comprising:
   a steering component for automatically controlling the steering mechanism of said mobile machine; and
   an integrated guidance system comprising:
      a position determining system for determining the geographic position of said mobile machine;
      a guidance system coupled with said position determining system for generating a course correction upon detecting a deviation of said mobile machine from a desired direction;
      a display coupled with said guidance system for visually indicating the deviation from the desired direction; and
      a steering interface coupled with said guidance system and with said steering component, said steering interface for determining whether at least one of an electric and a hydraulic steering component is coupled to said mobile machine and for independently controlling said electric or hydraulic steering component in response to receiving said course correction from said guidance system.

2. The system of claim 1 wherein said position determining system is a ground based position determining system.

3. The system of claim 1 wherein said position determining system is a satellite based position determining system.

4. The system of claim 3 wherein said satellite based position determining system is selected from the group consisting of a global positioning system (GPS) system, a differential GPS system, a real-time kinematics (RTK) system, a networked RTK system, a GLONASS system, and a Galileo system.

5. The system of claim 1 wherein said steering interface generates a control voltage to said steering component.

6. The system of claim 1 further comprising a serial communication bus which communicatively couples said integrated guidance system and said steering component.

7. The system of claim 6 wherein said serial communication bus is substantially compliant with controller area network (CAN) protocol.

8. The system of claim 1 wherein said steering interface is further operable for controlling a hydraulic steering component that is coupled with the steering mechanism of said mobile machine.

9. The system of claim 1 wherein said steering component comprises:
   an electric motor coupled with said steering interface; and
   an actuator device coupled with said electric motor and configured to control the steering mechanism of said mobile machine.

10. The system of claim 9 wherein said electric motor is directly coupled with said actuator device.

11. The system of claim 9 wherein said electric motor is coupled with said actuator device via a gear.

12. The system of claim 9 wherein said electric motor is selected from the group consisting of a permanent magnet brush direct current (DC) motor, a brushless DC motor, a stepper motor, and an alternating current (AC) servo motor.

13. The system of claim 9 wherein said electric motor is coupled with a steering column of said mobile machine and wherein said actuator device comprises a drive wheel which controls a steering wheel of said steering mechanism.

14. The system of claim 13 wherein said actuator device controls said steering wheel via a sub wheel which is coupled with said steering wheel.

15. The system of claim 9 wherein said actuator device is coupled with a steering shaft of said mobile machine.

16. The system of claim 1 further comprising a detection component for determining when a user is steering said mobile machine and for initiating disengagement of said steering component in response to said determining.

17. The system of claim 1 wherein said integrated guidance system further comprises a housing and wherein said position determining component, said guidance system, said display, and said steering interface are disposed within said housing.

18. The system of claim 1 wherein said display comprises at least one of a display device for displaying text and graphics and a lightbar device adapted for providing a visual indication of a deviation from a desired direction.

19. An integrated guidance system for controlling a mobile machine, said control component comprising:
a position determining system for determining the geographic position of said mobile machine;
a guidance system coupled with said position determining system for determining a course correction for said mobile machine based upon position data received from said position determining system;
a display coupled with said guidance system for visually indicating a deviation of said mobile machine from a desired direction; and
a steering interface coupled with said guidance system and for generating a steering command based upon said course correction, and wherein said steering command is conveyed to at least one of an electric steering component and a hydraulic steering component as determined by said steering interface coupled with the steering mechanism of said mobile machine.

20. The control component of claim 19 wherein said integrated guidance system and said steering component communicate via a serial communication bus.

21. The control component of claim 20 wherein said serial communication bus is substantially compliant with the controller area network (CAN) protocol.

22. The control component of claim 19 wherein said position determining system is a ground based position determining system.

23. The control component of claim 19 wherein said position determining system is a satellite based position determining system.

24. The control component of claim 23 wherein said satellite based position determining system is selected from the group consisting of a global positioning system (GPS) system, a differential GPS system, a real-time kinematics (RTK) system, a networked RTK system, a GLONASS system, and a Galileo system.

25. The control component of claim 19 wherein a control voltage is conveyed to either of said electric steering component and said hydraulic steering component in response to said steering command.

26. The control component of claim 19 wherein said steering component comprises:
an electric motor coupled with a steering column of said mobile machine; and
an actuator device coupled with said electric motor and configured to control the steering mechanism of said mobile machine.

27. The control component of claim 26 wherein said electric motor is directly coupled with said actuator device.

28. The control component of claim 26 wherein said electric motor is coupled with said actuator device via a gear.

29. The control component of claim 26 wherein said electric motor is selected from the group consisting of a permanent magnet brush direct current (DC) motor, a brushless DC motor, a stepper motor, and an alternating current (AC) servo motor.

30. The control component of claim 26 wherein said actuator device comprises a drive wheel which is coupled with the steering wheel of said mobile machine.

31. The control component of claim 30 wherein said drive wheel is coupled with the steering wheel via a sub wheel which is coupled with the steering wheel.

32. The control component of claim 26 wherein said actuator device is coupled with a steering shaft of said mobile machine.

33. The control component of claim 19 wherein said steering component further comprises:
a detection component for determining when a user is steering said mobile machine and for initiating disengagement of said electric steering component and said hydraulic steering component in response to said determining.

34. The control component of claim 19 further comprising a housing and wherein said position determining system, said guidance system, said display, and said steering interface are disposed within said housing.

35. The control component of claim 19 wherein said display comprises at least one of a display device for displaying text and graphics and a lightbar device adapted for providing a visual indication of the deviation of said mobile machine from the desired direction.

36. A method for controlling a mobile machine comprising:
utilizing a position determining system to determine the geographic position of said mobile machine and wherein said position determining system is disposed within a housing of an integrated guidance system;
using a guidance system disposed within a housing to generate a course correction in response to detecting a deviation of said mobile machine from a desired direction;
using a display disposed within said housing to visually indicate the deviation of said mobile machine from a desired direction; and
using a to steering interface disposed within said housing determine at least one of a hydraulic and electric output and to control a steering mechanism coupled to said mobile machine in response to said course correction.

37. The method as recited in claim 36 wherein said position determining system comprises a ground based position determining system.

38. The method as recited in claim 36 wherein said position determining system comprises a satellite based position determining system.

39. The method as recited in claim 36 wherein said satellite based position determining system is selected from the group consisting of a global positioning system (GPS) system, a differential GPS system, a real-time kinematics (RTK) system, a networked RTK system, a GLONASS system, and a Galileo system.

40. The method as recited in claim 36 further comprising:
generating a control voltage in response to said course correction.

41. The method as recited in claim 36 further comprising:
using a serial communication bus to communicatively couple a steering interface of said integrated guidance system with said steering component.

42. The method as recited in claim 41 wherein said serial communication bus is substantially compliant with the controller area network (CAN) protocol.

43. The method as recited in claim 36 wherein said integrated guidance system is operable for controlling a hydraulic steering component.

44. The method as recited in claim 36 wherein said steering component comprises:
  an electric motor coupled with said integrated guidance system; and
  an actuator device coupled with said electric motor and configured to control the steering mechanism of said mobile machine.

45. The method as recited in claim 44 wherein said electric motor is directly coupled with said actuator device.

46. The method as recited in claim 44 wherein said electric motor is coupled with said actuator device via a gear.

47. The method as recited in claim 44 wherein said electric motor is selected from the group consisting of a permanent magnet brush direct current (DC) motor, a brushless DC motor, a stepper motor, and an alternating current (AC) servo motor.

48. The method as recited in claim 44 wherein said actuator device comprises a drive wheel which controls a steering wheel of said steering mechanism.

49. The method as recited in claim 44 wherein said actuator device controls said steering wheel via a sub wheel which is coupled with said steering wheel.

50. The method as recited in claim 44 wherein said actuator device is coupled with a steering shaft of said mobile machine.

51. The method as recited in claim 36 further comprising:
  determining when a user is manually steering said mobile machine; and
  disengaging said steering component in response to said determining.

52. The method as recited in claim 36 further comprising:
  visually indicating the deviation of said mobile machine from the desired direction using one of a display device adapted for displaying text and graphics and a lightbar device adapted for providing a visual indication of the deviation of said mobile machine from the desired direction.

* * * * *

UNITED STATES PATENT AND TRADEMARK OFFICE
CERTIFICATE OF CORRECTION

PATENT NO. : 7,200,490 B2 Page 1 of 1
APPLICATION NO. : 10/987096
DATED : April 3, 2007
INVENTOR(S) : Arthur Lange, Gregory Robin Price and Gregory Craig Wallace It is certified that error appears in the above-identified patent and that said Letters Patent is hereby corrected as shown below:

Column 20, Line 37, (claim 36), change "using a to steering interface disposed within said housing" to -- using a steering interface disposed within said housing to--.

Signed and Sealed this

Twenty-first Day of August, 2007

JON W. DUDAS
*Director of the United States Patent and Trademark Office*